US009794164B2

(12) United States Patent
Li et al.

(10) Patent No.: US 9,794,164 B2
(45) Date of Patent: Oct. 17, 2017

(54) MOBILE RELAY NETWORK INTELLIGENT ROUTING

(71) Applicant: TangoMe, Inc., Mountain View, CA (US)

(72) Inventors: Qing Li, Pleasanton, CA (US); Meng Zhang, Santa Clara, CA (US); Haiying Yang, San Francisco, CA (US)

(73) Assignee: TangoMe, Inc., Mountain View, CA (US)

( * ) Notice: Subject to any disclaimer, the term of this patent is extended or adjusted under 35 U.S.C. 154(b) by 198 days.

(21) Appl. No.: 14/470,595

(22) Filed: Aug. 27, 2014

(65) Prior Publication Data
US 2016/0065446 A1  Mar. 3, 2016

(51) Int. Cl.
*H04L 12/28* (2006.01)
*H04L 12/727* (2013.01)
*H04W 40/02* (2009.01)
*H04L 12/26* (2006.01)

(52) U.S. Cl.
CPC ............ *H04L 45/121* (2013.01); *H04L 43/10* (2013.01); *H04W 40/02* (2013.01); *H04L 43/0864* (2013.01)

(58) Field of Classification Search
CPC ..... H04W 84/18; H04W 40/02; H04W 40/12; H04W 40/20; H04W 40/246; H04W 40/28; H04W 4/02; H04L 45/02; H04L 67/101; H04L 41/147; H04L 43/0864; H04L 45/00; H04L 45/121; H04L 45/22; H04L 45/26; H04L 45/70; H04L 43/10
USPC .......................... 370/315, 351, 238; 702/158
See application file for complete search history.

(56) References Cited

U.S. PATENT DOCUMENTS

| | | | |
|---|---|---|---|
| 7,948,917 B2 | 5/2011 | Hilt et al. | |
| 8,072,906 B2 | 12/2011 | Naghian et al. | |
| 8,682,611 B2 | 3/2014 | Nakadai et al. | |
| 2006/0007863 A1* | 1/2006 | Naghian | H04L 45/121 370/238 |
| 2007/0097951 A1* | 5/2007 | Hilt | H04L 45/02 370/351 |
| 2011/0172956 A1* | 7/2011 | Nakadai | H04L 45/126 702/158 |

* cited by examiner

*Primary Examiner* — Alex Skripnikov
*Assistant Examiner* — Lionel Preval (57) ABSTRACT

A method for determining a route for communication across a network in real-time, said method including: collecting a set of network delay information at a caller device; storing the set of network delay information at the caller device; based on a stored set of network delay information at the caller device and the callee device, determining, by the caller device, in cooperation with the callee device, a set of relay server candidates to be used to relay data packets between the caller device and the callee device; and based on calculated round trip times for probing data packets set out and sent back, selecting, by the caller device in cooperation with the callee device, a shortest routing path as an active routing path for use for transporting a first data packet between the caller device and the callee device.

14 Claims, 10 Drawing Sheets

COLLECTING A SET OF NETWORK DELAY INFORMATION AT A CALLER DEVICE, WHEREIN THE SET OF NETWORK DELAY INFORMATION INCLUDES DISTANCE INFORMATION RELATING TO A DISTANCE BETWEEN THE CALLER DEVICE, A CALLEE DEVICE AND THE RELAY SERVERS OF A SET OF RELAY SERVERS WITHIN A NETWORK
505

↓

STORING THE SET OF NETWORK DELAY INFORMATION AT THE CALLER DEVICE
510

↓

DETERMINING BY THE CALLER DEVICE IN COOPERATION WITH THE CALLEE DEVICE, BASED ON A STORED SET OF NETWORK DELAY INFORMATION AT THE CALLER DEVICE AND THE CALLEE DEVICE, A SET OF RELAY SERVER CANDIDATES TO BE USED OT RELAY DATA PACKETS BETWEEN THE CALLER DEVICE AND THE CALLEE DEVICE
515

↓

CALCULATING, BY THE CALLEE DEVICE IN COOPERATION WITH THE CALLEE DEVICE, A ROUND TRIP TIME FOR PROBING DATA PACKETS, THROUGH THE RELAY SERVER CANDIDATES OF THE SET OF RELAY SERVER CANDIDATES DETERMINED, SENT OUT BY THE CALLER DEVICE TO THE CALLEE DEVICE AND SENT BACK BY THE CALLEE DEVICE TO THE CALLER DEVICE, AND SENT OUT BY THE CALLEE DEVICE TO THE CALLER DEVICE AND SENT BACK BY THE CALLER DEVICE TO THE CALLEE DEVICE
520

↓

BASED ON THE CALCULATING, SELECTING, BY THE CALLER DEVICE IN COOPERATION WITH THE CALLEE DEVICE, A SHORTEST ROUTING PATH AS AN ACTIVE ROUTING PATH FOR USE FOR TRANSPORTING A FIRST DATA PACKET OF THE DATA PACKETS BETWEEN THE CALLER DEVICE AND THE CALLEE DEVICE
525

MOBILE RELAY NETWORK INTELLIGENT ROUTING

BACKGROUND

The degree of network delay between two phone clients, a caller and a callee, is critical to call performance in terms of video and audio quality, connect rate and packet loss. One cause of network delay relates to the routing of the calls. Conventional routing services locate the relay server closest to the caller.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Figure 4A:
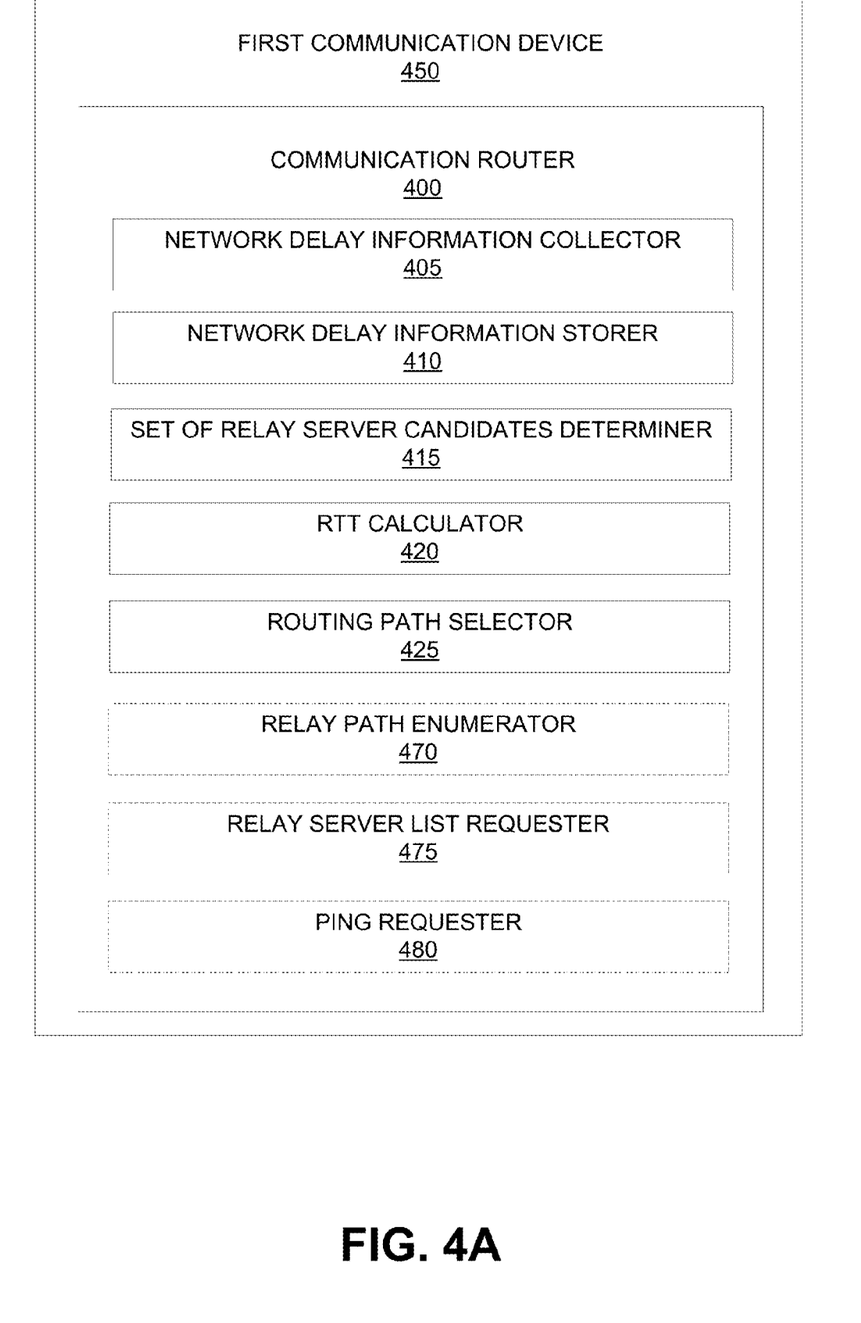
FIGS. 4A and 4B illustrate block diagrams of a communication router, in accordance with an embodiment.

Unless specifically stated otherwise as apparent from the following discussions, it is appreciated that throughout the present Description of Embodiments, discussions utilizing terms such as "collecting", "storing", "determining", "calculating", "selecting", "enumerating", "making", "requesting", "sending", "exchanging", or the like, often refer to the actions and processes of an electronic computing device (or portion thereof), module or system, such as, but not limited to, a communication router for determining a route for communication across a network in real-time (See FIG. 4A). The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Figure 2:
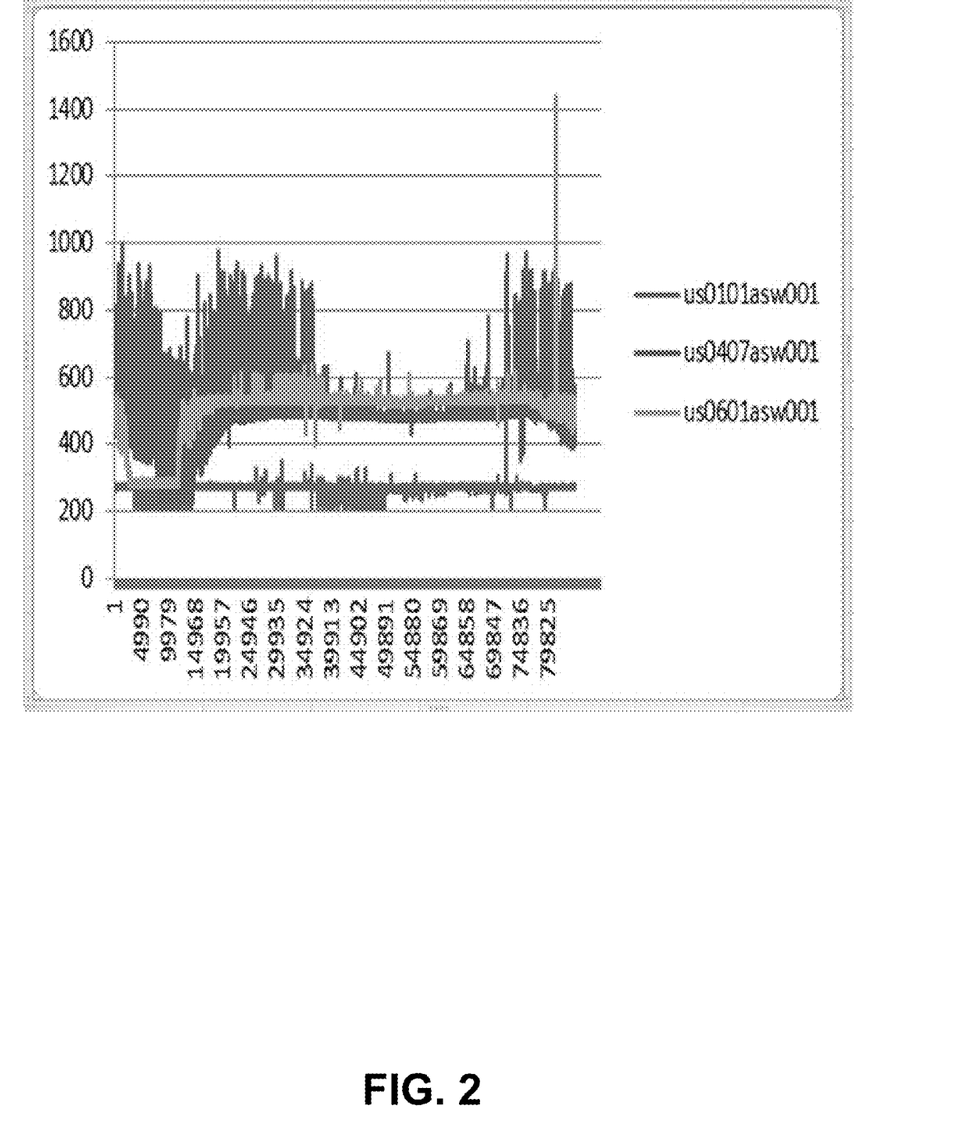
FIG. 2 illustrates statistics for a network delay over time for three network connections between three different servers located in the United States and one server located in China.
Figure 3:
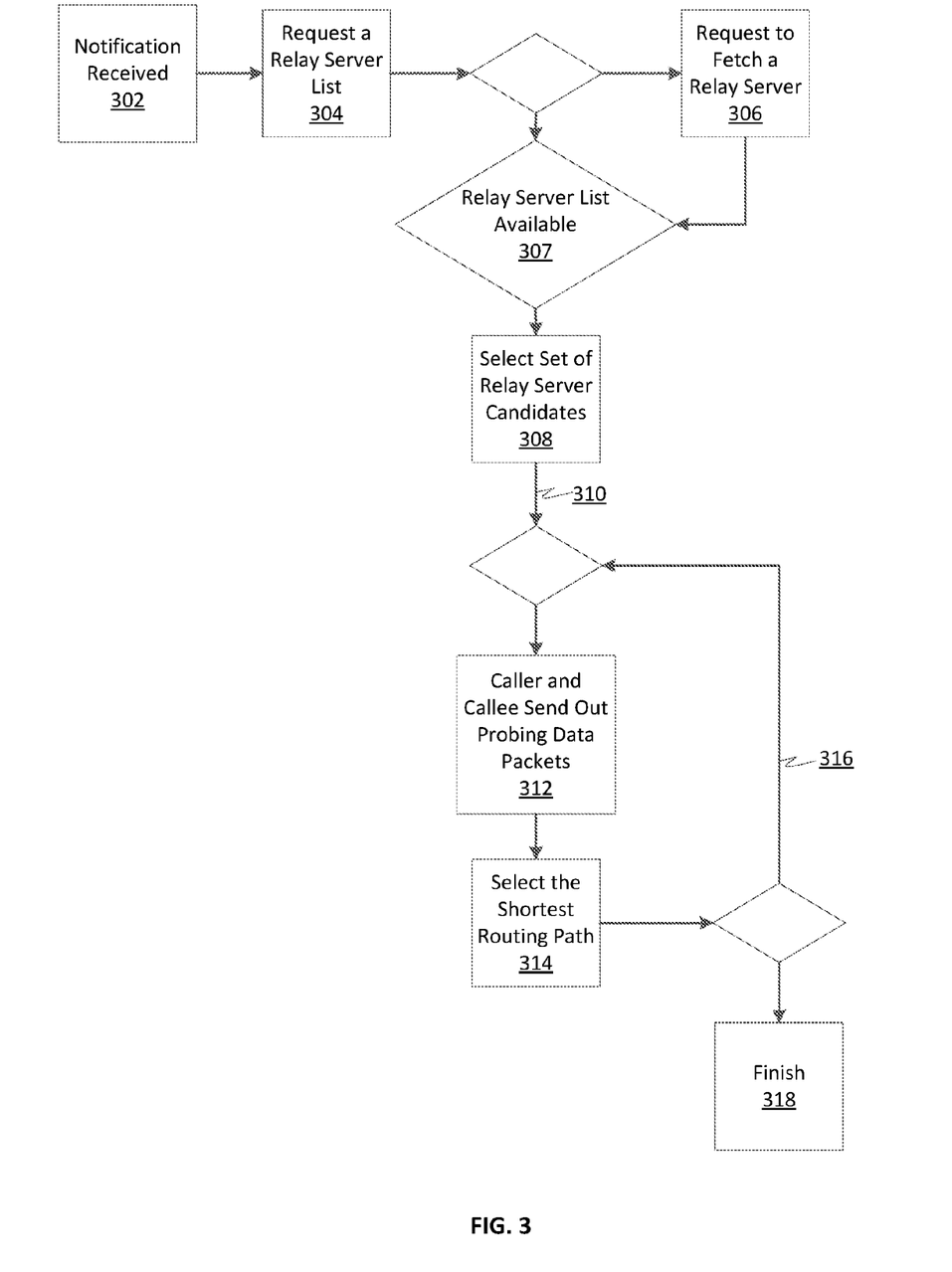
FIG. 3 illustrates a flow diagram for intelligent routing, in accordance with an embodiment.
Figure 4B:
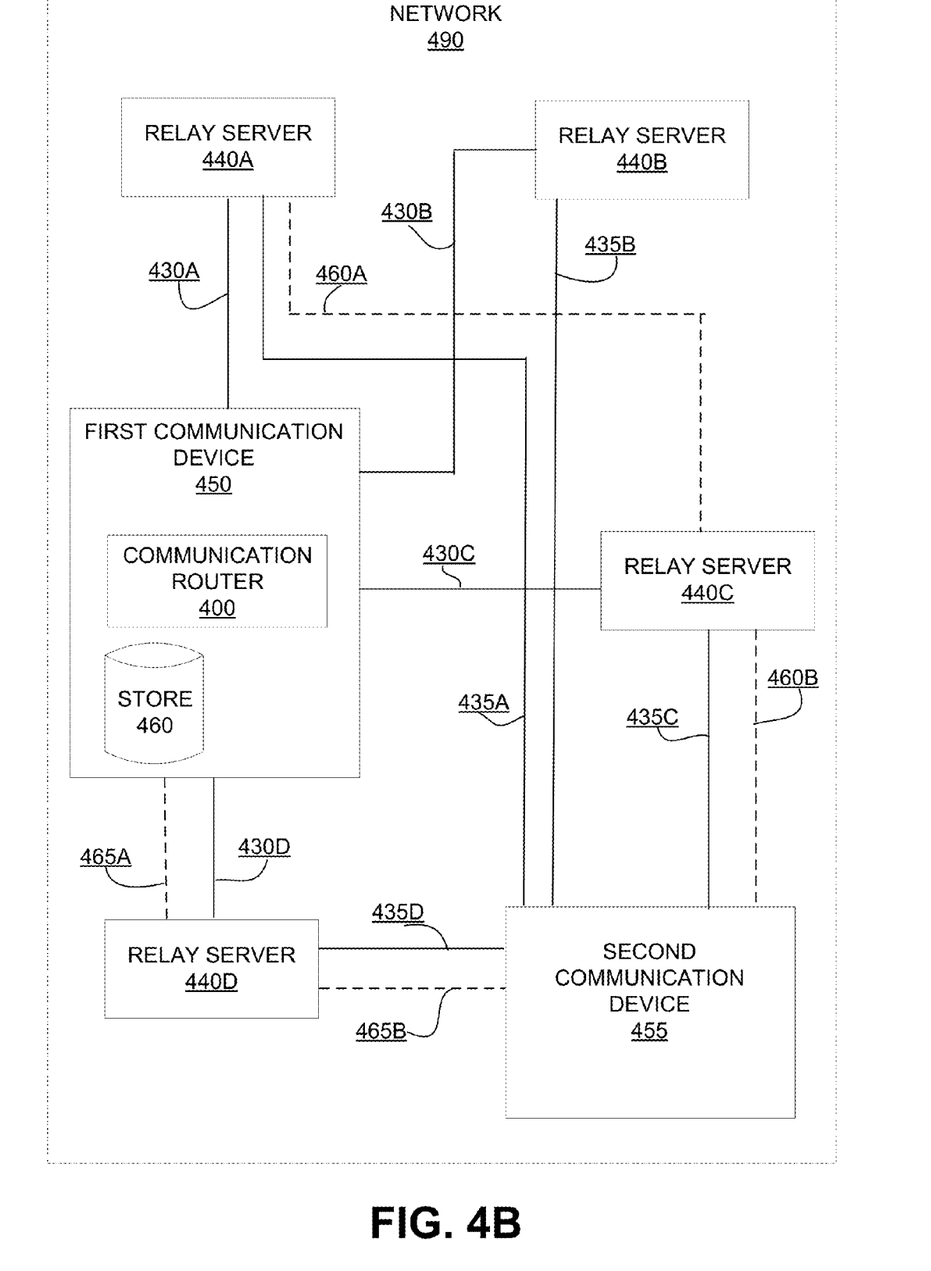

The discussion begins with a brief description of conventional methods for routing communication between mobile devices via a network. The discussion continues with a description of FIGS. 1 and 2 which illustrate conventional methods for routing communications via relay servers. The discussion then turns to a general description of an embodiment for routing communications via servers, in accordance with an embodiment. FIG. 3, a flow diagram of a method for intelligently routing communication between mobile devices via relay servers, in accordance with an embodiment, is next discussed. FIGS. 4A and 4B, block diagrams of a communication router for routing communication across a network in real-time, in accordance with an embodiment, is then discussed. Following, FIGS. 5A, 5B, 6A and 6B, flow charts illustrating a method for determining a route for communication across a network in real-time, in accordance with various embodiments, are discussed. Finally, the discussion concludes with a description of an example computer system upon which the example communication router and the example methods described herein operate. (See FIG. 7.)

Conventional System and Methods for Routing Communications Between Relay Servers The degree of network delay between two phone clients, a caller and a callee, affects call performance in terms of video and audio quality, connect rate and packet loss. Network delay during a phone call may be caused during, for example, a routing of the phone call through a mobile relay network, as will be explained below.

Conventionally, a peer-to-peer (P2P) direct connection creates a good network communication channel between mobile phone users. However, in some situations, a P2P direct connection cannot be established. For example, a mobile phone (a caller and/or a callee) may be behind a particular network address translation (NAT) network such that the data packet is unable to traverse the NAT network to reach the callee of the mobile phone. In this situation in which the data packet is unable to traverse the NAT network, the mobile communication must be relayed by servers. Thus, the mobile phones have to rely on a mobile relay network for communication, and conventional routing services locate the relay server closest to the caller.

Figure 1:
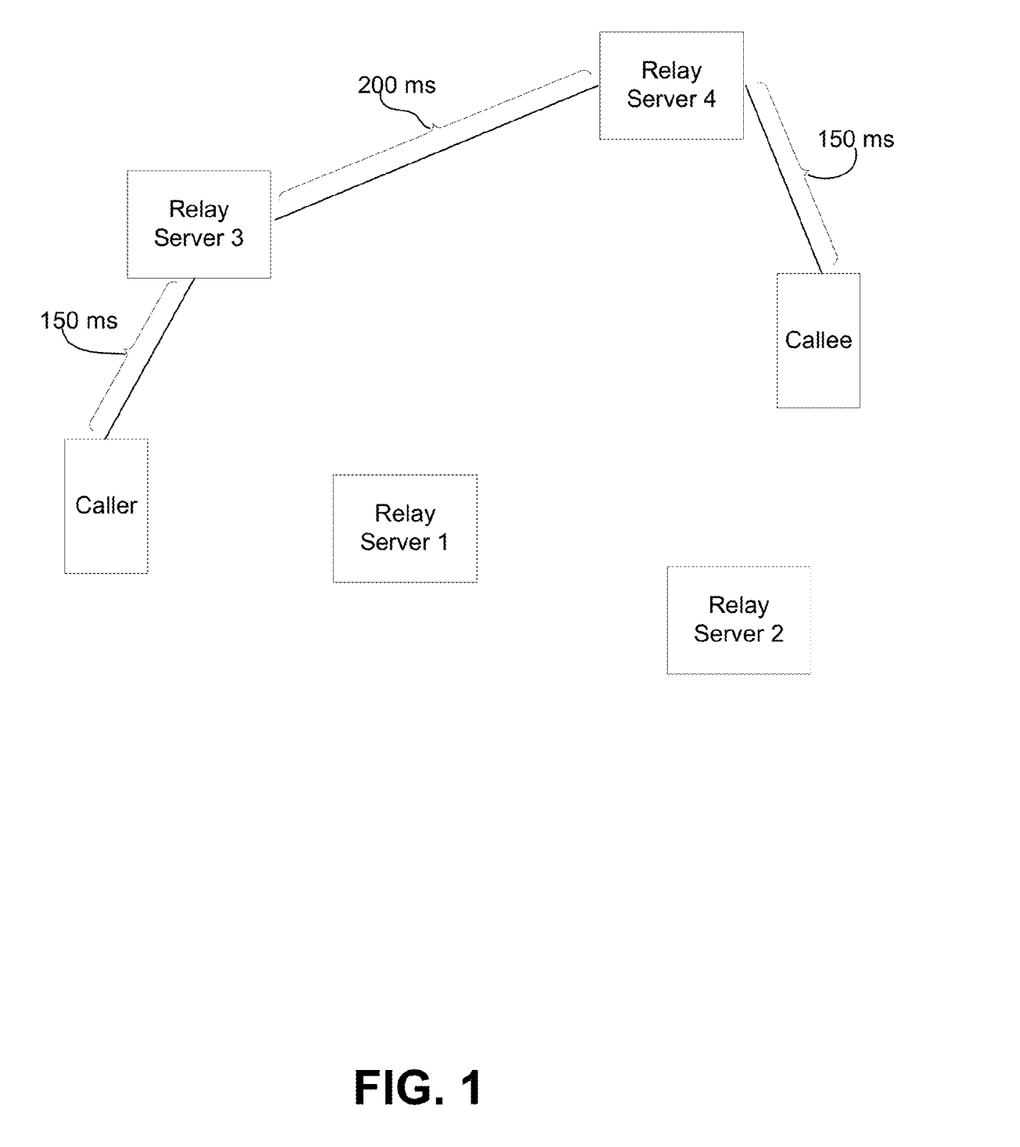
FIG. 1 is a block diagram that illustrates a conventional simplified mobile relay network.

FIG. 1 illustrates a conventional simplified mobile relay network, in which the round trip time ("RTT") is calculated for the routing path chosen. The RTT is the length of time it takes for a signal to be sent plus the length of time it takes for an acknowledgment of that signal to be received. The signal is generally a data packet and the RTT time is also known as the ping time. In FIG. 1, in consideration of the RTT calculated between all possibilities between the caller and the callee, the path relayed via the relay server 3 and relay server 4 is determined to be the shortest path between the caller and the callee. The RTT between the caller and the relay server 3 is 150 ms, the relay server 3 and the relay server 4 is 200 ms and the relay server 4 and the callee is 150 ms. While not shown, the RTT between the caller and the relay server 1 is 150 ms, the relay server 1 and the relay server 2 is 200 ms., the relay server 2 and the callee is 200 ms, the caller and the relay server 2 is 600 ms, the caller and the relay server 4 is 500 ms, the relay server 3 and the relay server 1 is 100 ms, the relay server 3 and the relay server 2 is 200 ms, the relay server 1 and the callee is 400 ms, the relay server 1 and the relay server 4 is 250 ms and the relay server 3 and the callee is 500 MS.

As will be explained, there are many challenges involving the conventional method of choosing relay servers and in finding the shortest routing path.

Firstly, a normal relay network may globally deploy hundreds of relay servers. Thus, there are an exponential number of possible relay paths for use between a caller and a callee. Conventional technology is unable to evaluate all of the available paths in real-time in order to determine the best, most efficient pathway.

Secondly, the network delay experienced by server-to-server and mobile phone-to-mobile phone communication fluctuates over time. FIG. 2 illustrates statistics for a network delay over time. FIG. 2 shows three network connections, "A", "B" and "C", between three different servers located in the United States and a server located in China. The vertical axis represents the network delay, RTT in ms, for the network connections between the servers. The horizontal axis represents the time (in seconds) elapsed since 12:00 a.m. FIG. 2 also shows that one network connection may have, over a span of time, an RTT that varies from 250 ms to 1400 ms, over the course of a communication or over different communication over the course of a day. Thus, FIG. 2 illustrates that the network delay experienced over the three network connections, "A", "B" and "C" fluctuates over time.

Thirdly, network delays may not be consistent with geographical distance. For example, the network delay may be greater in a communication using a server "D" compared to using a server "E", even though the server "D" is geographically closer to a mobile phone caller than the server "E". In another example, for the same distance, a data packet may likely take a longer time to travel via a 3G network than a Wifi network. In addition to the physical distance between mobile phone peers, network delay is also affected by other factors, such as network bandwidth, congestion and hardware setup. As such, a geographical distance-based solution is not suitable for relay server selection.

Mobile Relay Network Intelligent Routing

As will be explained below, embodiments provide for intelligent network routing that determines the best relay routing paths for call participants. Embodiments also provide the capability to distribute the load among relay servers based on each relay server's performance. Embodiments improve the audio and video call bit rate, and also reduce call RTT and data packet loss rates.

Embodiments use a network RTT as a network delay/distance metric, as is explained in the following discussion. Firstly, relay server candidates are selected based on a known network RTT between the mobile phone callers and the server. Secondly, the routing paths between the caller and the callee that could possibly be used to relay data packets by these server candidates are determined. Thirdly, probing data packets measure each possible relay path's RTT. Fourthly, the relay path with the least RTT is selected as the shortest relay path for use to send and receive data packets between the caller and the callee. In some embodiments, after a certain period of time has elapsed, each relay path is re-probed and the shortest relay path is selected. This re-probing process addresses the network connectivity fluctuation issue discussed above.

The network RTT is measured at real-time by sending out a probing data packet to a destination. To reduce complexity in probing various relay paths, embodiments only consider the relay paths with, at most, two relay servers therein, since adding more relays between these two servers will not improve the network connectivity. Relay server candidates are selected based on a single relay and a two relay server path model (a.k.a., a single-hop and a two-hop relay path model). A relay server candidate for the single-hop relay path is determined to be the relay server closest to both the caller and the callee. Relay server candidates for the two-hop relay path include the relay server that is closest to the caller and the relay server that is closest to the callee.

In contrast to most routing protocols or routing algorithms, in which routing information and decision-making are confined to the router/server, embodiments provide for the routing caller or callee to store all of the routing related information and make the routing decisions for each outgoing data packet.

Thus, based on the foregoing, embodiments improve network connectivity and call quality.

FIG. 3 illustrates a flow diagram for intelligent routing, according to an embodiment. In accordance with embodiments, although not shown, the caller initiates an "intelligent routing process" and notifies the callee, via a default relay server, of such initiation. The callee sends back an acknowledgement of such notification. The initial state of the intelligent routing process is represented at 302 as a notification of the acknowledgment having been received by the caller.

At step 304 and in accordance with an embodiment, the caller then requests a relay server list from the connected relay server after receiving the acknowledgment from the callee. Also, the callee requests a relay server list from the caller after sending back the acknowledgment. If the relay sever list is not available to send to the callee, then the callee sends a request, at step 306, to fetch a relay server list from a connected relay server.

After the relay server list is made available to both the caller and the callee (see step 307), at step 308, and in accordance with an embodiment, a set of relay server candidates from the relay server list is selected by the caller. Selecting a set of relay server candidates includes several steps. Both the caller and the callee make a ping request to each relay server of the relay server list and then collect network delay information as related to each relay server. In one embodiment, the network delay information includes distance information between the caller and the relay server and/or the callee and the relay server. (The RTT will be used as a delay/distance metric.) The caller and the callee exchange server distance information. Based on this exchanged distance information, the caller and the callee determine server candidates to be used to relay probing data packets. The server candidates include a relay server closest to the caller, a relay server closest to the callee and a relay server closest to both the caller and the callee.

At step 310 and in accordance with an embodiment, the caller and the callee enumerate the possible one-hop and two-hop relay paths using the selected server candidates.

At step 312 and in accordance with an embodiment, the caller and the callee send out probing data packets to each other via these relay paths. The caller and the callee then sends back the probing data packets via the same relay path. The RTT is calculated by the difference between the time that the probing data packet is sent and the time that probing data packet is received.

At step 314 and in accordance with an embodiment, each mobile phone participant selects the shortest routing path, as per the calculated RTT at step 312, as the active routing path to use for transporting a data packet between the caller and the callee until the next probing stage.

At step 316 and in accordance with an embodiment, since the network characteristics may change over time, probing is executed periodically to adjust the active routing path. Steps 312 and 314 follow step 316, in one embodiment.

At 318, the method in accordance with embodiments is finished.

Embodiments providing intelligent routing provide a more complete solution than conventional methods used to route calls. For example, while the conventional method is able to locate the relay server closest to the caller, this does not guarantee that the path is the shortest. Intelligent routing also determines the routing paths in real-time and continues to update the routing paths over time; intelligent routing provides a dynamic routing solution compared to conventional manual routing solutions.

Thus, embodiments provide real-time/dynamic solutions to determine the best relay routing path for call clients. The overall call RTT and data packet loss rates are reduced. The audio and video call bit rates are improved. The load is distributed among relay servers based on each relay server's performance. Additionally, intelligent routing provides the capability to limit the relay server traffic.

Example Communication Router

FIGS. 4A and 4B illustrate block diagrams of a communication router, located at a first communication device, for determining a route for communication across a network in real-time. The communication router is located at a device(s) capable of communication with other devices, such as, but not limited to, the following devices: mobile phone; tablet; desktop; and laptop.

With reference to both FIGS. 4A and 4B, in embodiments, the communication router 400 includes: a network delay information collector 405; a network delay information storer 410; a set of relay server candidates determiner 415; an RTT calculator 420; and a routing path selector 425. In further optional embodiments, the communication router 400 may include any of the following: a relay path enumerator 470; a relay server list requester 475; and a ping requester 480.

In explanation of the above components of the communication router 400 in accordance with various embodiments, the following description is presented.

FIG. 4B shows a network 490, that includes a first communication device 450 and a second communication device 455 and the relay servers 440A, 440B, 440C and 440D, hereinafter, "set of relay servers 440". The network delay information collector 405 collects a first network delay information. The first network delay information includes a first distance information relating to a distance between the first communication device 450 and each relay server 440A, 440B, 440C and 440D of the set of relay servers 440. The first distance information "430" is the accumulation of the following network delay measurements: the network delay 430A between the first communication device 450 and the relay server 440A; the network delay 430B between the first communication device 450 and the relay server 440B; the network delay 430C between the first communication device 450 and the relay server 440C; and the network delay 430D between the first communication device 450 and the relay server 440D.

In one embodiment, the first communication device 450 is a caller device and the second communication device 455 is a callee device. In one embodiment, the first communication device 450 is a mobile device and the second communication device 455 is a mobile device. The first communication device 450 is different from the second communication device 455.

The network delay information storer 410 stores the first network delay information at the first communication device 450. Additionally, the second communication device 455 collects and stores a second network delay information. The second network delay information includes a second distance information relating to a distance between the second communication device 455 and the each relay server 440A, 440B, 440C and 440D of the set of relay servers 440. The second distance information "435" is the accumulation of the following network delay measurements: the network delay 435A between the second communication device 455 and the relay server 440A, the network delay 435B between the second communication device 455 and the relay server 440B, the network delay 435C between the second communication device 455 and the relay server 440C and the network delay 435D between the second communication device 455 and the relay server 440D.

The set of relay server candidates determiner 415 determines, based on a stored set of network delay information by the network delay information storer 410, in cooperation with the second communication device 455, a set of relay server candidates to be used to relay probing data packets between the first communication device 450 and the second communication device 455. In one embodiment, the set of relay server candidates includes a relay server that is closest (in terms of the measured network delay) to the first communication device 450, such as the relay server 440A; a relay server that is closest (in terms of the measured network delay) to the second communication device 455, such as the relay server 440C, and a relay server that is closest (in terms of the physical distance) to both the first communication device 450 and the second communication device 455, such as the relay server 440D. The term, "in cooperation with" is used to refer to the second communication device 455 also determining which set of relay server candidates of the relay servers 440 are to be used to relay probing data packets. Both the first communication device 450 and the second communication device 455 use and share (make accessible to each other) resources (e.g., information) to determine which set of relay server candidates of the relay servers 440 are to be used to relay probing data packets.

The round trip time calculator 420 calculates, in cooperation with the second communication device 455, a round trip time for probing data packets 1) sent out by the first communication device 450 and sent back by the second communication device 455 to the first communication device 450, and 2) sent out by the second communication device 455 to the first communication device 450 and sent back by the first communication device 450 to the second communication device 455. In other words, the round trip time calculator 420 calculates, in cooperation with the second communication device 455, a round trip time for probing data packets sent out and sent back by the caller device and the callee device and to each other.

The routing path selector 425 selects, in cooperation with the second communication device 455, a shortest routing path as an active routing path for use for transporting a first data packet between the first communication device 450 and the second communication device 455. The term, "in cooperation with" is used to refer to the second communication device 455 also selecting the shortest routing path (the shortest routing path is measured in network delay time compared to all other routing paths between relay server candidates), based on information available to the second communication device 455.

In one embodiment, the relay path enumerator 470 enumerates, in cooperation with the second communication device 455, possible one-hop and two-hop relay paths using the set of relay server candidates that was determined. A one-hop relay path is that relay path through which communication (signals) travels from the first communication device 450 to a relay server to the second communication device 455. For example, and with reference to FIG. 4B, a one-hop relay path would be exemplified by the first communication device 450 sending a signal, such as a probing data packet, to the relay server 440A, and then to the second communication device 455. The two-hop relay path is that relay path through which communication (signals) travels from the first communication device to a first relay server to a second relay server to the second communication device. For example, and with reference to FIG. 4B, a two-hop relay path would be exemplified by the first communication device 450 sending a signal, such as a probing data packet, to the relay server 440A, then to the relay server 440C, and then to the second communication device 455. Embodiments use one or two-hop relay paths. As stated herein, the server relay candidate for the single-hop relay path is the relay server closest to both the first communication device 450 (e.g., caller) and the second communication device 455 (e.g., callee). The server relay candidate for the two-hop relay path is the relay server closest to the first communication device 450 (e.g., caller) and the relay server closest to the second communication device 455 (e.g., callee).

In another embodiment, the relay path enumerator 470 is further configured for enumerating, in cooperation with the second communication device 455, possible relay paths that have more than two-hops, such as, but not limited to being, a three-hop relay path and a four-hop relay path.

In one embodiment, the relay server list requester 475 requests a relay server list from the second communication device 455. The relay server list is a list of relay servers in the network 490 possibly available for use in the relay of communication between the first communication device 450 and the second communication device 455. In one embodiment, in regard to the relay server list being received, a ping requester 480 makes a ping request to each relay server of the relay server list. Subsequent, the network delay information as related to each relay server is collected. The network delay information is stored in the network delay information storer 410A "ping" is a basic Internet program that allows a user to verify that a particular IP address exists and can accept requests.

Example Operation of Method for Determining a Route for Communication Across a Network in Real-Time The following discussion sets forth in detail some example methods of operation of embodiments. With reference to FIGS. 5A, 5B, 6A and 6B, the flow diagram of methods 500 and 600 illustrate an example procedure used by various embodiments. Methods 500 and 600 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in methods 500 and 600, such procedures are examples. That is, embodiments are well suited to performing various other procedures or variations of the procedures recited in methods 500 and 600, alone or in combination. Likewise, in some embodiments, the procedures in methods 500 and 600, alone or in combination, may be performed in an order different than presented and/or not all of the procedures described in one or more of these flow diagrams may be performed. It is further appreciated that procedures described in methods 600 and 700, alone or in combination, may be implemented in hardware, or a combination of hardware with firmware and/or software.

Figure 5A:
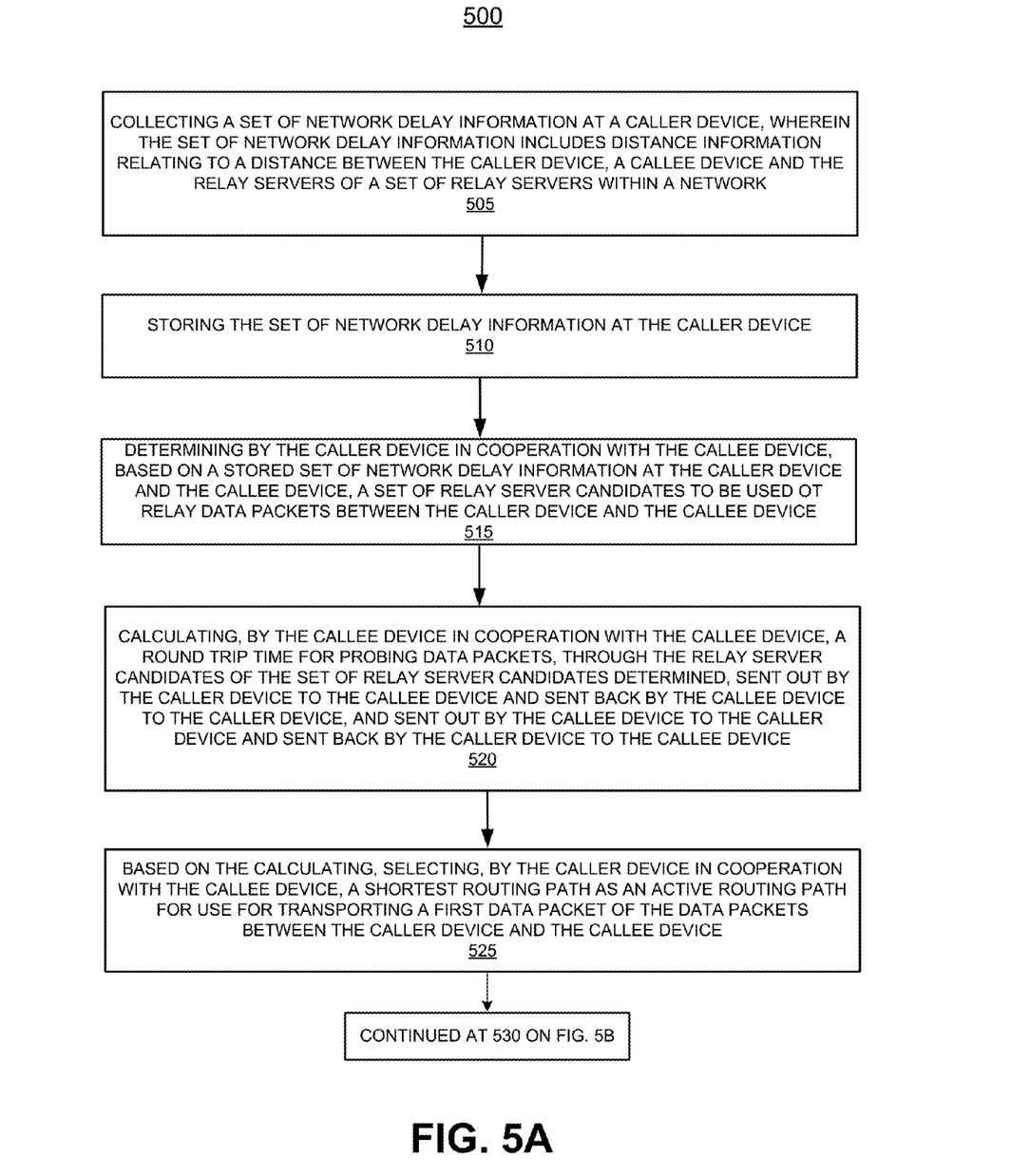
FIGS. 5A and 5B illustrate a flow diagram of a method for determining a route for communication across a network in real-time, in accordance with an embodiment.
Figure 5B:
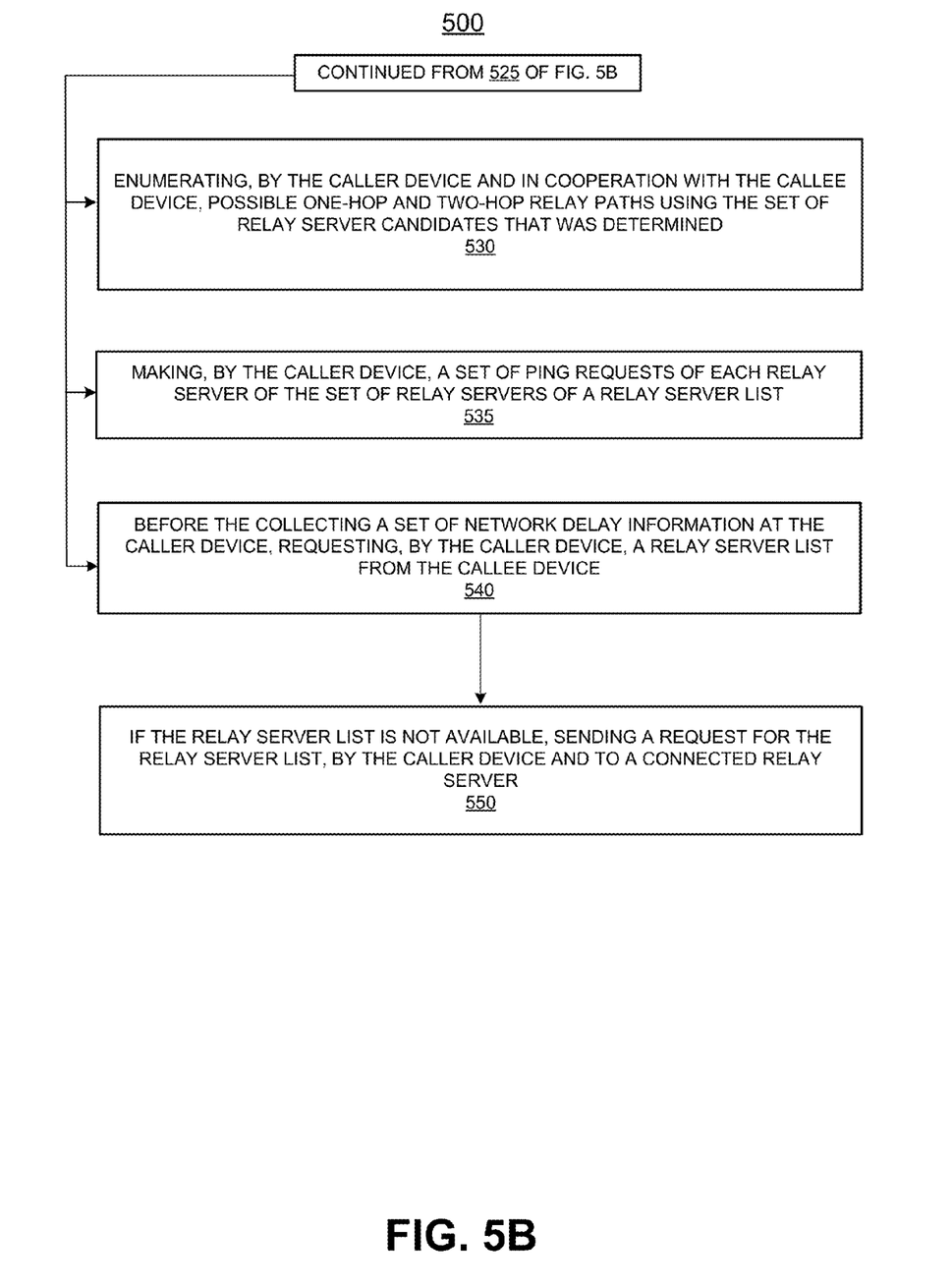

FIGS. 5A and 5B represent a flow diagram of a method 500 for determining a route for communication across a network in real-time, in accordance with an embodiment. All of, or a portion of, the procedures described by method 500 can be implemented by a processor or computer system executing instructions which reside, for example, on computer-usable/readable media. The following discussion of method 500 references FIGS. 4A and 4B, 5A and 5B, unless specifically noted otherwise.

At step 505 of method 500, in one embodiment and as described herein, a set of network delay information is collected at a caller device and a callee device. The set of network delay information includes distance information relating to a distance between the caller device, the callee device and the relay servers of a set of relay servers 440 within the network 490.

At step 510 of method 500, in one embodiment and as described herein, the set of network delay information is stored at the caller device.

At step 515 of method 500, in one embodiment and as described herein, based on a stored set of network delay information, the caller device, in cooperation with the callee device, determines a set of relay server candidates to be used to relay data packets between the caller device and the callee device. With reference to step 515, the language "in cooperation with" refers to both the caller device and the callee device both using network delay information that is possibly stored (at the store 460) at the caller device and stored at the callee device (the "store" at the callee device [second communication device 455, in one embodiment] is not shown), if accessible and available, to determine which relay server candidates may potentially be used to relay data packets between the caller device and the callee device. Not until the RTT is calculated may a determination be made as to which server candidate(s) are to be used for relaying one or more data packets. The set of relay server candidates, in one embodiment, includes a first relay server closest to the caller device, a second relay server closest to the callee device and a third relay server closest to both the caller device and the callee device.

At step 520 of method 500, the caller device, in cooperation with the callee device, calculates a round trip time for probing data packets, through the relay server candidates of the set of relay server candidates determined at step 515, sent out and sent back by the caller device and the callee device and to each other through relay server candidates of the set of relay server candidates. The term, "in cooperation with" with respect to step 520, refers to the caller device and the callee device, exchanging information regarding probing data packets, such as, but not limited to, an acknowledgment that a probing data packet was received and/or the time at which a probing data packet is sent and received. Thus, the RTT may be calculated by the caller device by determining the time that the probing data packet was sent to the callee device and the time that the probing data packet was received back from the callee device. The callee device may likewise also calculate the RTT for a probing data packet to be sent by the callee device to the caller device and received back by the callee device. Both the caller device and the callee device may send an acknowledgment that the probing data packet was indeed received at the intended destination. This acknowledgment may be inherent in, for example, the caller device receiving the same probing data packet from the callee device that was sent to the callee device.

At step 525 of method 500, in one embodiment and as described herein, based on the calculating performed at step 520, the caller device, in cooperation with the callee device, selects a shortest routing path as an active routing path for use for transporting a first data packet of the data packets between the caller device and the callee device. For example, the shortest routing path is reflected by the least (smallest) RTT calculated for a particular relay path between the caller devices, through a relay server, to the callee device. The term, "in cooperation with" with regard to the step 525, refers to the caller device and the callee device sharing information regarding the calculations performed at step 520. For example, it is possible that the caller device calculated the RTT for each relay path for relay paths, "A", "B" and "C", and that the callee device calculated the RTT for each relay path of the relay paths, "D", "E" and "F". The caller device and the callee device share these RTT calculations. The smallest RTT of the calculated RTTs for the routing paths, "A", "B", "C", "D", "E" and "F" is discovered and selected. In this example, the smallest RTT calculation is associated with the routing path "C". Thus, the routing path "C" is selected as the "active routing path". The routing path "C" is the active path since it will be used for transporting data packets between the caller device and the callee device.

In one embodiment and as described herein, the method 500 further includes at step 530, the caller device in cooperation with the callee device enumerating possible one-hop and two-hop relay paths using the set of relay server candidates that was determined. With respect the performance of step 530, the language, "in cooperation with" refers to the callee device and the caller device sharing whatever information that is necessary to be shared in order that the possible one-hop and two-hop relay paths may be enumerated. In one embodiment, a relay path with more than two-hops may be enumerated (e.g., three-hop relay path, four-hop relay path).

In one embodiment and as described herein, the method 500 further includes at step 535, the caller device making a set of ping requests of each relay server of the set of relay servers of the relay server list.

In one embodiment and as described herein, the method 500 further includes at step 545, the callee device requesting a relay server list from the caller device.

In one embodiment and as described herein, the method 500 further includes at step 550, if the relay server list is not available, the caller device and/or the callee device sends a request for the relay server list to a connected relay server.

Thus, embodiments provide a system and method for, in real-time, locating the shortest routing path between two clients (caller and callee) by selecting relay server candidates, probing the relay server candidates with data packets, and comparing relay routing paths.

Figure 6A:
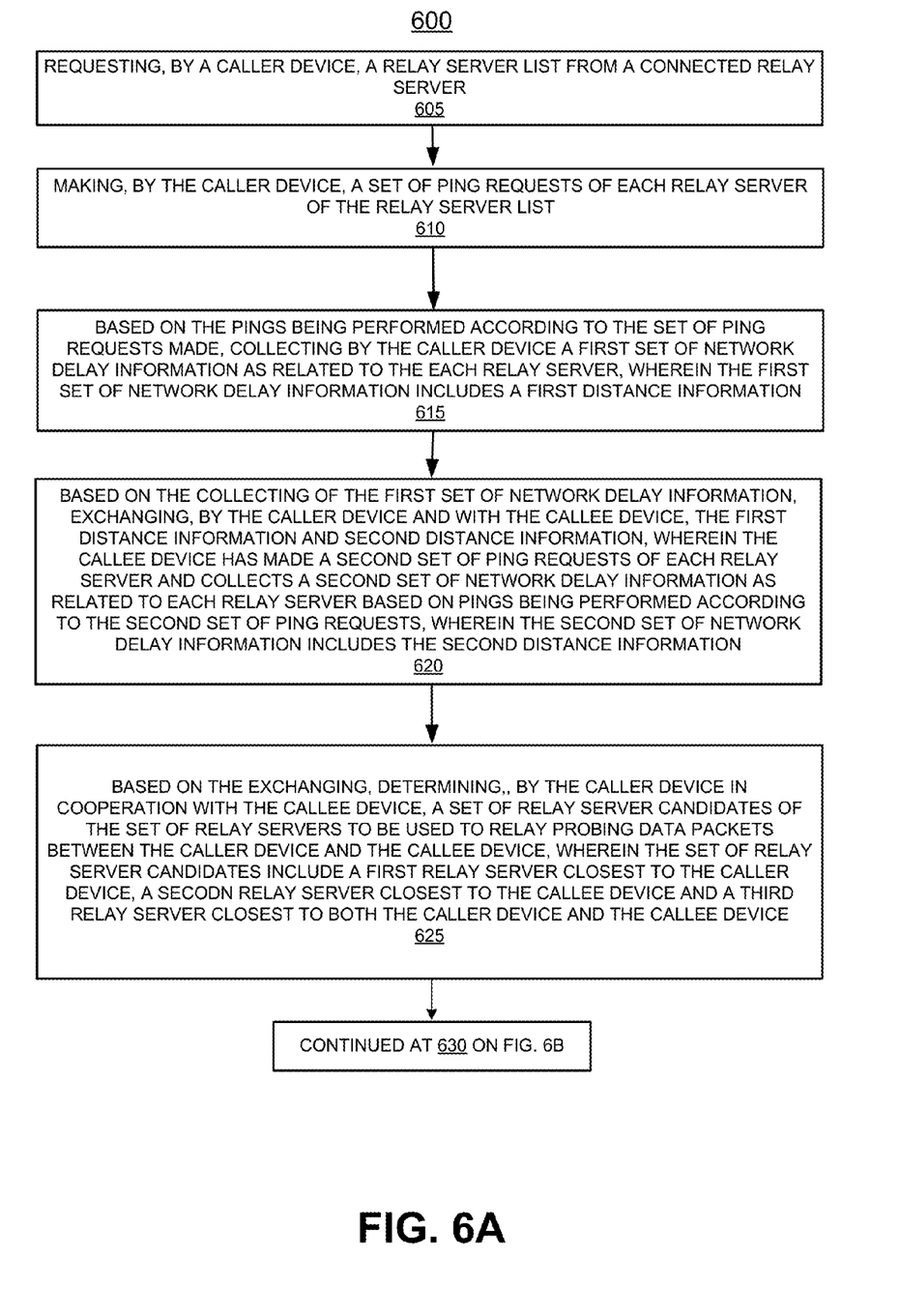
FIGS. 6A and 6B illustrate a flow diagram of a method for determining a route for communication across a network in real-time, in accordance with an embodiment.
Figure 6B:
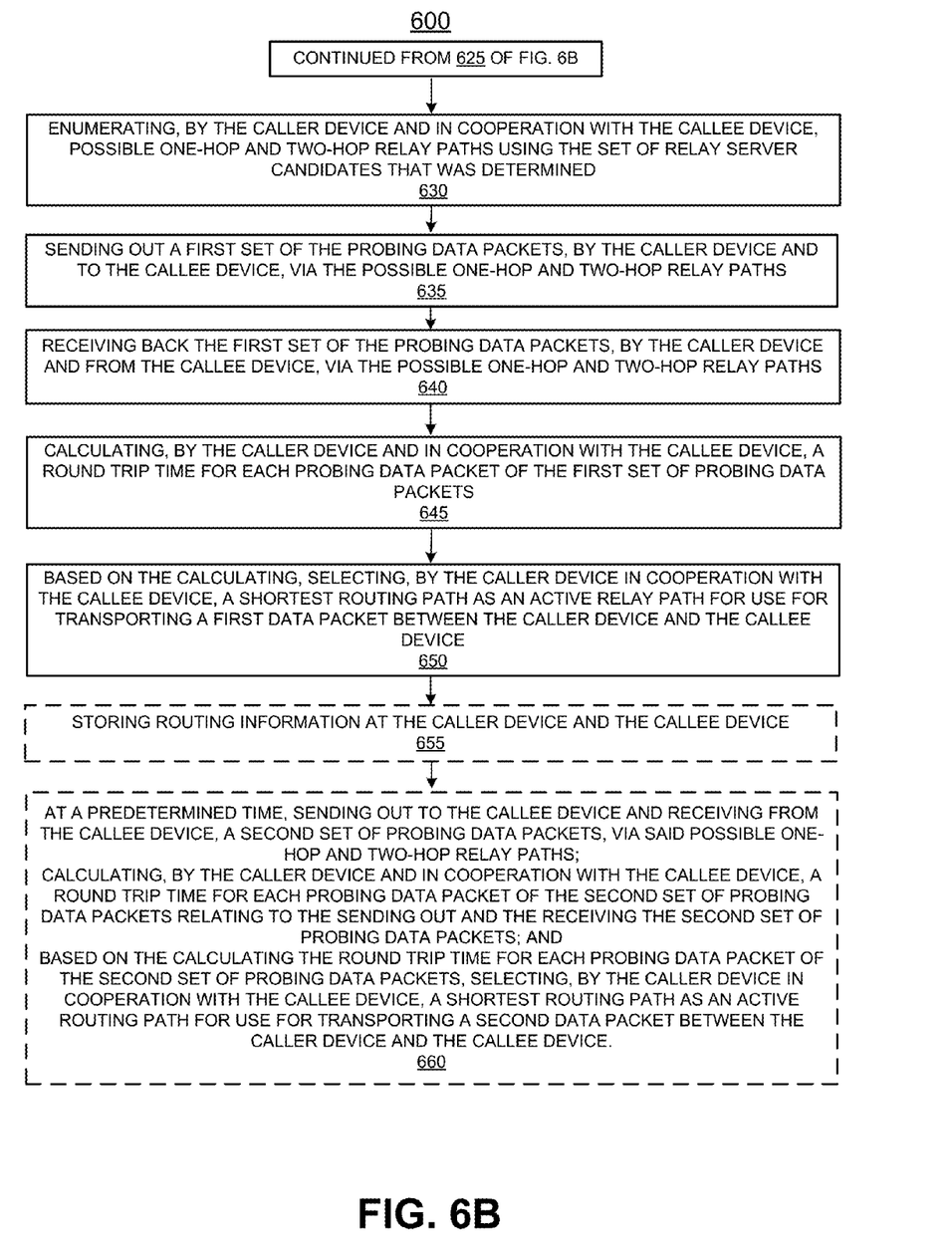

FIGS. 6A and 6B represent a flow diagram of a method 600 for determining a route for communication across a network in real-time, in accordance with an embodiment. All of, or a portion of, the procedures described by method 600 can be implemented by a processor or computer system executing instructions which reside, for example, on computer-usable/readable media. The following discussion of method 600 references FIGS. 4A and 4B, 6A and 6B, unless specifically noted otherwise.

At step 605 of method 600, in one embodiment and as described herein, a caller device requests a relay server list from a connected relay server. The caller device is an example of the first communication device 450 of FIGS. 4A and/or 4B. (A callee device is an example of the second communication device 455 of FIG. 4B.)

At step 610 of method 600, in one embodiment and as described herein, the caller device makes a set of ping requests of a set of relay servers of the relay server list that was received from the connected relay server in response to the request made at step 605. It should be appreciated that the set of ping requests may be one or more ping requests, wherein each relay server of the set of relay servers of the relay server list receives one ping according to the set of ping requests. Further, it should be appreciated that the set of relay servers may be one or more relay servers.

At step 615 of method 600, in one embodiment and as described herein, based on the pings being performed according to the set of ping requests made at step 610, the caller device collects a first set of network delay information as related to each relay server of the set of relay servers, wherein the first set of network delay information includes a first distance information. The first distance information includes the determined distance (related to network delay, as described herein) between the caller device and the relay server to which the ping is sent. Further, the callee device makes a set of ping requests of each relay server of the relay server list. The callee device collects a second set of network delay information as related to each relay server of the set of relay servers based on the pings being performed according to the set of ping requests. The second set of network delay information includes second distance information. The second distance information includes the determined distance between the callee device and the relay server to which the ping is sent.

At step 620, in one embodiment and as described herein, based on the collecting performed at step 615, the caller device and the callee device exchange the first distance information and the second distance information with each other.

At step 625, in one embodiment and as described herein, based on the exchanging performed at step 620, the caller device, in cooperation with the callee device, determines a set of relay server candidates of the set of relay servers to be used to relay probing data packets between the caller device and the callee device. The set of relay server candidates includes the following: a first relay server closest to the caller device; a second relay server closest to the callee device; and a third relay server closest to both the caller device and the callee device.

At step 630, in one embodiment and as described herein, the caller device, in cooperation with the callee device, enumerates possible one-hop and two-hop relay paths using the set of relay server candidates that was determined.

At step 635, in one embodiment and as described herein, the caller device and the callee device send out a first set of probing data packets to each other, via the possible one-hop and two-hop relay paths.

At step 640, in one embodiment and as described herein, the caller device and the callee device send back the first set of probing data packets to each other, via the possible one-hop and two-hop relay paths.

At step 645, in one embodiment and as described herein, the caller device and in cooperation with the callee device, calculates a round trip time for each probing data packet of the first set of probing data packets.

At step 650, in one embodiment and as described herein, based on the calculating performed at step 645, the caller device in cooperation with the callee device, selects a shortest routing path as an active routing path for used for transporting a first data packet between the caller device and the callee device.

At step 655, in one embodiment and as described herein, the method 600 further includes storing routing information at the caller device.

At step 660, the method 600 further includes: at a predetermined time, sending out and sending back, by the caller device and the callee device and to each other, a second set of probing data packets, via the possible one-hop and two-hop relay paths; calculating, by the caller device and in cooperation with the callee device, a round trip time for each probing data packet of the second set of probing data packets relating to the sending out and the sending back of the second set of probing data packets; and based on the calculating of the round trip time for each probing data packet of the second set of probing data packets, selecting, by the caller device and in cooperation with the callee device, a shortest routing path as an active relay path for use for transporting a second data packet between the caller device and the callee device.

Intelligent Routing for Use in a Secured Wireless Session Initiative Framework

Embodiments described herein with regard to intelligent routing may be used in conjunction with the Secured Wireless Session Initiative Framework (SWIFT), as is described in U.S. application Ser. No. 13/834,152, filed on Mar. 15, 2013, and is incorporated herein by reference thereto. In brief, the SWIFT provides a method and system for reducing the connection establishment time during the connection of two clients (e.g., caller and callee) in real-time communication. SWIFT uses the same server for NAT traversal, call establishment and traffic relay, thereby helping to re-establish calls (e.g., on a 2G/wifi switch) and to further reduce the number of connections that a client needs to open and/or manage during the call establishment process.

Example Computer System Environment

Figure 7:
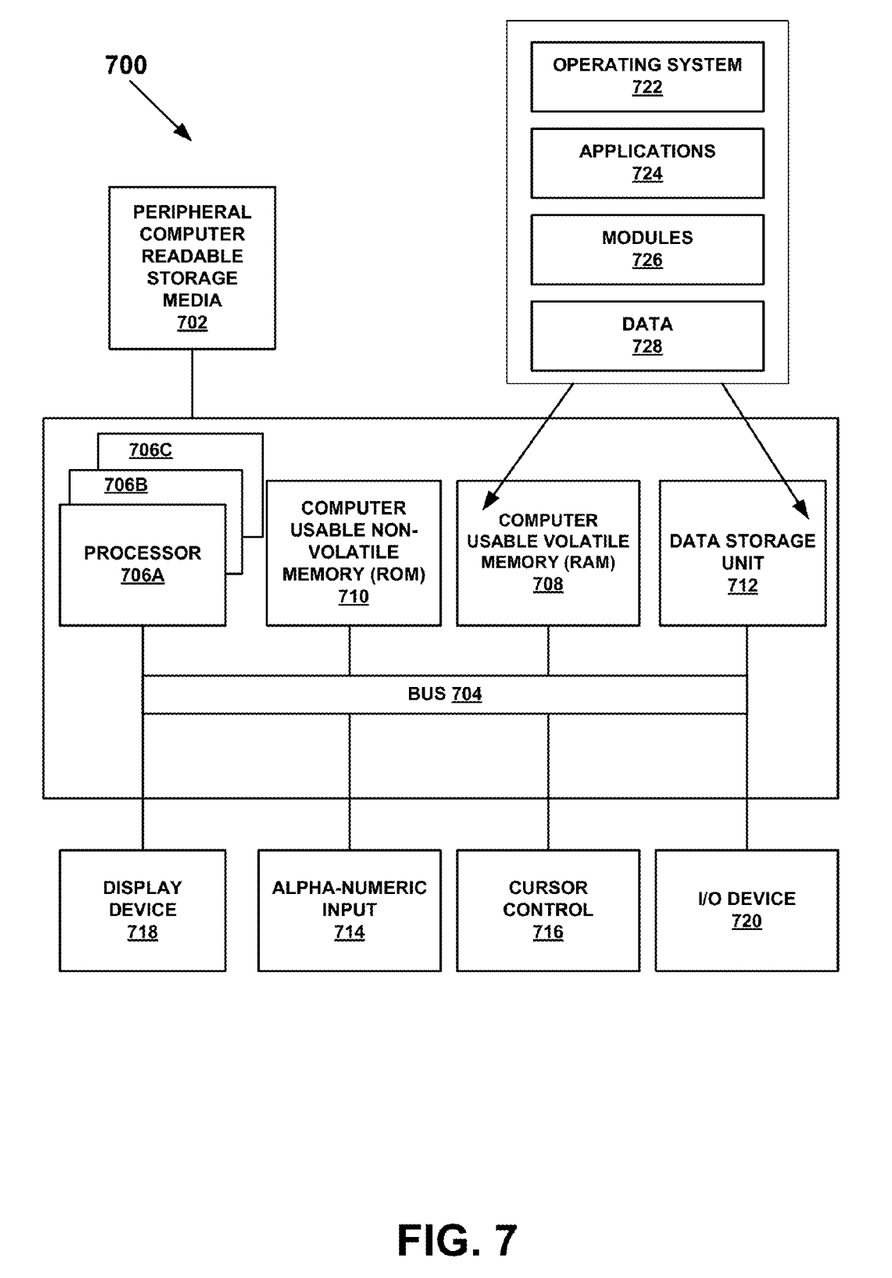
FIG. 7 illustrates an example of a type of computer that can be used to implement various embodiments.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 700) that can be used in accordance with or to implement various embodiments which are discussed herein. It is appreciated that computer system 700 of FIG. 700 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 700 of FIG. 7 is well adapted to having peripheral non-transitory computer-readable storage media 702 such as, for example, a floppy disk, a compact disc, digital versatile disc, other disc based storage, universal serial bus "thumb" drive, removable memory card, and the like coupled thereto.

System 700 of FIG. 7 includes an address/data bus 704 for communicating information, and a processor 706A coupled with bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g., random access memory (RAM), coupled with bus 704 for storing information and instructions for processors 706A, 706B, and 706C.

System 700 also includes computer usable non-volatile memory 710, e.g., read only memory (ROM), coupled with bus 704 for storing static information and instructions for processors 706A, 706B, and 706C. Also present in system 700 is a data storage unit 712 (e.g., a magnetic or optical disk and disk drive) coupled with bus 704 for storing information and instructions. System 700 also includes an optional alphanumeric input device 714 including alphanumeric and function keys coupled with bus 704 for communicating information and command selections to processor 706A or processors 706A, 706B, and 706C. System 700 also includes an optional cursor control device 716 coupled with bus 704 for communicating user input information and command selections to processor 706A or processors 706A, 706B, and 706C. In one embodiment, system 700 also includes an optional display device 718 coupled with bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

What we claim is:

1. A computer-implemented method for determining a route for communication across a network in real-time, said computer-implemented method comprising:
    initiating, by a caller device, a routing process for communication across the network;
    notifying a callee, via a relay server of a set of relay servers, of the initiating of the routing process;
    requesting, by the caller device, a relay server list from the callee device,
    if said relay server list is not available from the callee device, sending a request for said relay server list, by said caller device and to a connected relay server;
    collecting a set of network distance and/or delay information at the caller device, wherein said set of network distance and/or delay information comprises;
    collecting a network delay information relating to a sum of delays between said caller device, the callee device and the relay servers of the set of relay servers within said network,
    collecting a set of network distance information at the caller device, wherein said set of network distance information comprises distance information relating to an actual physical distance between said caller device, the callee device and the relay servers of the set of relay servers within said network;
    storing said set of network distance and/or delay information at said caller device;
    based on a stored set of network distance and/or delay information at said caller device and said callee device, determining by said caller device in cooperation with said callee device, a set of relay server candidates of said set of relay servers to be used to relay data packets between said caller device and said callee device;
    calculating, by said caller device in cooperation with said callee device, a round trip time for probing data packets sent out and sent back by said caller device and said callee device and to each other through relay server candidates of said set of relay server candidates; and
    based on said calculating, selecting, by said caller device in cooperation with said callee device, a shortest routing path as an active routing path for use for transporting a first data packet of said data packets between said caller device and said callee device.

2. The computer-implemented method of claim 1, wherein said set of relay server candidates comprises a first relay server closest to said caller device, a second relay server closest to said callee device and a third relay server closest to both said caller device and said callee device.

3. The computer-implemented method of claim 1, further comprising: enumerating, by said caller device and in cooperation with said callee device, possible one-hop and two-hop relay paths using said set of relay server candidates that was determined.

4. The computer-implemented method of claim 1, further comprising: making, by said caller device, a set of ping requests of each relay server of said set of relay servers of a relay server list.

5. A computer-implemented method for determining a route for communication across a network in real-time, said computer-implemented method comprising:
    initiating, by a caller device, a routing process for communication across the network;
    notifying a callee, via a relay server of a set of relay servers, of the initiating of the routing process;
    requesting, by the caller device, a relay server list from the callee device,
    if said relay server list is not available from the callee device, sending a request for said relay server list, by said caller device and from a connected relay server;
    making, by said caller device, a set of ping requests of each relay server of said relay server list;
    based on pings being performed according to said set of ping requests, collecting, by said caller device, a first set of network delay information as related to said each relay server, wherein said first set of network delay information comprises first delay information;
    based on said collecting, exchanging, by said caller device and with said callee device, a distance information,
    said distance information relating to an actual physical distance between said caller device, the callee device and each relay server,
    wherein said callee device has made a second set of ping requests of said each relay server and collects a second set of network delay information as related to said each relay server based on pings being performed according to said second set of ping requests, wherein said second set of network delay information comprises said second delay information;
    based on said exchanging, determining, by said caller device and in cooperation with said callee device, a set of relay server candidates of said set of relay servers to be used to relay probing data packets between said caller device and said callee device, wherein said set of relay server candidates comprise a first relay server closest to said caller device, a second relay server closest to said callee device and a third relay server closest to both said caller device and said callee device;
    enumerating, by said caller device and in cooperation with said callee device, possible one-hop and two-hop relay paths using said set of relay server candidates that was determined;
    sending out a first set of said probing data packets, by said caller device and to said callee device, via said possible one-hop and two-hop relay paths;

receiving back said first set of said probing data packets, by said caller device and from said callee device, via said possible one-hop and two-hop relay paths;

calculating, by said caller device and in cooperation with said callee device, a round trip time for each probing data packet of said first set of said probing data packets; and based on said calculating, selecting, by said caller device in cooperation with said callee device, a shortest routing path as an active routing path for use for transporting a first data packet between said caller device and said callee device.

6. The computer-implemented method of claim 5, further comprising: storing routing information at said caller device.

7. The computer-implemented method of claim 5, further comprising:
   at a predetermined time, sending out to said callee device and receiving back from said callee device, a second set of probing data packets, via said possible one-hop and two-hop relay paths;
   calculating, by said caller device and in cooperation with said callee device, a round trip time for each probing data packet of said second set of probing data packets relating to said sending out and said receiving said second set of probing data packets; and
   based on said calculating said round trip time for each probing data packet of said second set of probing data packets, selecting, by said caller device in cooperation with said callee device, a shortest routing path as an active routing path for use for transporting a second data packet between said caller device and said callee device.

8. A communication router, located at a first communication device, for determining a route for communication across a network in real-time, said communication router comprising:
   a network distance and/or delay information collector configured for collecting a first network distance and/or delay information, wherein said first network distance and/or delay information comprises;
   a first distance information relating to a distance between said first communication device and each relay server of a set of relay servers of a network, and
   a first network delay information relating to a sum of delays between said first communication device and each relay server of said set of relay servers of said network;
   a network distance and/or delay information storer configured for storing said first network distance and/or delay information at said first communication device, wherein a second communication device collects and stores a second network distance and/or delay information, wherein said second network distance and/or delay information comprises;
   a second distance information relating to a distance between said second communication device and said each relay servers of said set of relay servers, and
   a second network delay information relating to a sum of delays between said second communication device and each relay server of said set of relay servers of said network;
   a set of relay server candidates determiner configured for, based on a stored set of network distance and/or delay information, determining in cooperation with said second communication device, a set of relay server candidates of said set of relay servers to be used to relay probing data packets between said first communication device and said second communication device;
   a round trip time calculator configured for calculating, in cooperation with said second communication device, a round trip time for probing data packets sent out and sent back by said first communication device and said second communication device and to each other, through said set of relay server candidates; and
   a routing path selector configured for, based on said calculating, selecting, in cooperation with said second communication device, a shortest routing path as an active routing path for use for transporting a first data packet of said data packets between said first communication device and said second communication device.

9. The communication router of claim 8, wherein said set of relay server candidates comprises:
   a first relay server closest to said first communication device; a second relay server closest to said second communication device; and a third relay server closest to said first communication device and said second communication device.

10. The communication router of claim 8, wherein said first communication device is a caller device and said second communication device is a callee device.

11. The communication router of claim 8, wherein said first communication device is a mobile device and said second communication device is a mobile device.

12. The communication router of claim 8, further comprising:
   a relay path enumerator configured for enumerating, in cooperation with said second communication device, possible one-hop and two-hop relay paths using said set of relay server candidates that was determined.

13. The communication router of claim 8, further comprising:
   a relay server list requester configured for requesting a relay server list from said second communication device.

14. The communication router of claim 13, further comprising:
   a ping requester configured for requesting delivery of a set of ping requests to each relay server of said relay server list.

* * * * *